Sept. 15, 1925.  N. P. SJOBRING ET AL  1,553,726
ELECTRIC WELDING MACHINE
Original Filed July 21, 1920
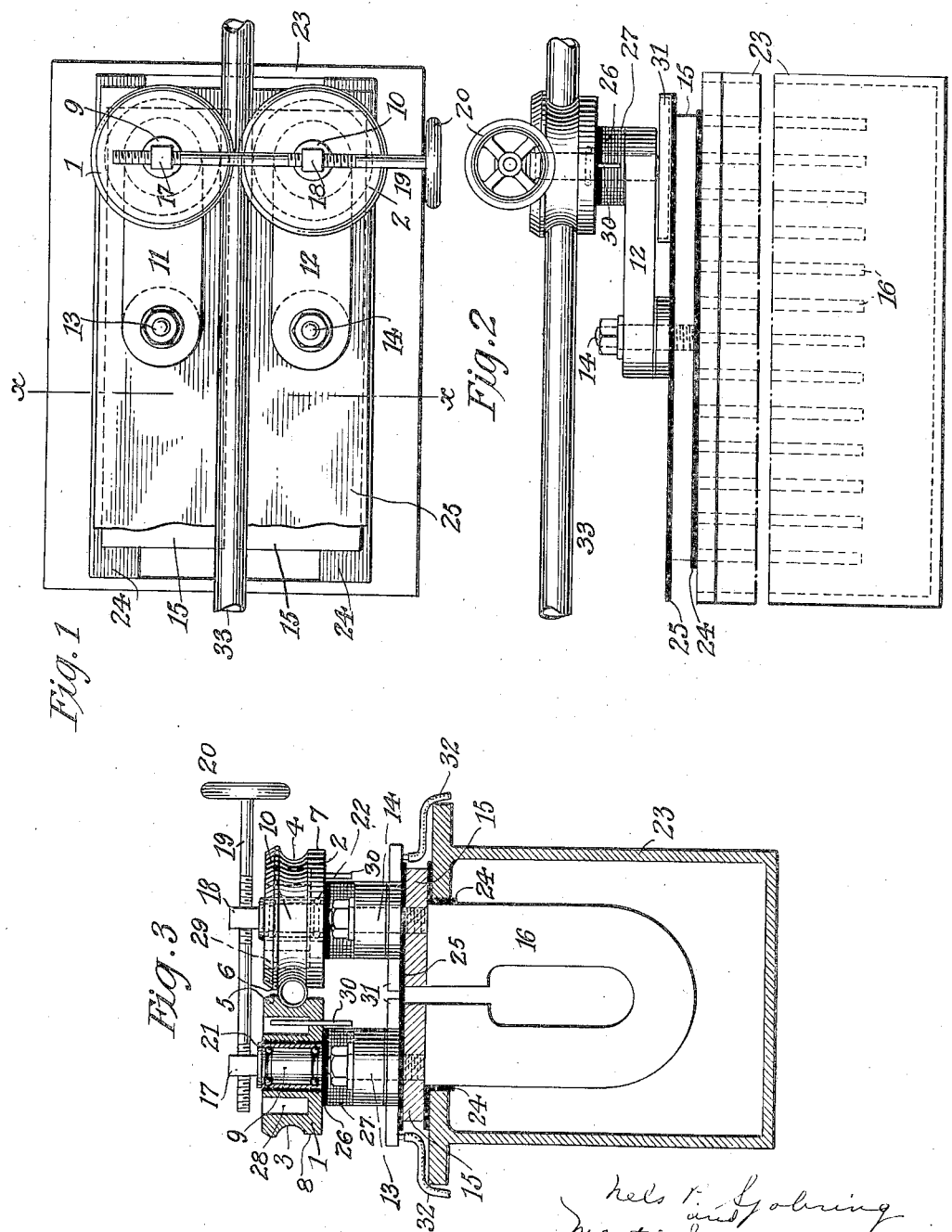

Patented Sept. 15, 1925.

1,553,726

UNITED STATES PATENT OFFICE.

NELS P. SJOBRING AND MARTIN SWANSON, OF CHICAGO, ILLINOIS, ASSIGNORS, BY MESNE ASSIGNMENTS, TO GLOBE STEEL TUBES CO., OF MILWAUKEE, WISCONSIN, A CORPORATION OF DELAWARE.

ELECTRIC WELDING MACHINE.

Application filed July 21, 1920. Serial No. 397,898.

*To all whom it may concern:*

Be it known that we, NELS P. SJOBRING and MARTIN SWANSON, citizens of the United States, residing at Chicago, in the county of Cook and State of Illinois, have invented a certain new and useful Improvement in Electric Welding Machines, of which the following is a specification.

Our invention relates to that class of machines which is more particularly designed to weld tubing, and has for its object to provide a construction which will permit the gripping of a larger surface of the tube, thus forming a more perfect weld even when operated at a high rate of speed; also to simplify the construction of machines of this type and to provide improved means for making the electric contact with the welding apparatus. and also improved means of cooling the same. It has for its further object to provide a unique method of mounting the welding mechanism upon a tank containing the transformer, and has for its further object to provide means for cooling the transformer. Other objects will appear from the hereinafter appended specification and claims.

Our means of accomplishing the foregoing objects may be more readily understood by having reference to the accompanying drawings which are hereunto annexed and are a part of this specification in which—

Fig. 1 is a top or plan view of a machine constructed in accordance with our invention.

Fig. 2 is a side view of the same.

Fig. 3 is a vertical sectional view in the direction of the arrows taken on the line x—x in Fig. 1.

Similar reference numerals refer to similar parts throughout the entire description.

As shown in the drawings, the welding operation is accomplished by a pair of copper rollers 1 and 2 which are provided with peripheral grooves 3 and 4 which coincide with the shape of the tube to be welded. These rollers are so constructed that when placed in juxtaposition, the upper flanges 5 and 6 will be appreciably closer than the lower flanges 7 and 8. This is to provide for the carrying of the heating electric current across the small gap between the flanges 5 and 6, as the current will seek the path of least resistance.

These rollers are carried by spindles 9 and 10 which spindles are vertical. These spindles are mounted in arms 11 and 12 which are pivotally attached by means of stud bolts 13 and 14 to lugs 15 projecting from the top of the transformer 16, the showing of the transformer being more or less diagrammatic as obviously it forms no part of our invention, with the exception that the unique construction provides for the mounting of the welding mechanism above and vertically upon the transformer tank.

The upper ends 17 and 18 of the spindles 9 and 10 are squared and provided with threaded apertures in which is mounted the adjustment screw 19 which is provided with right and left hand threads fitting to and coinciding with the threads formed in the apertures formed in the upper ends 17 and 18 of the spindles. This screw 19 may be provided with a hand wheel 20 to permit of the adjustment of the distance between the two spindles 9 and 10 and hence that of the two rollers.

The rollers 1 and 2 are provided with roller or ball bearings 21 and 22 which bearings are mounted in bushings formed of suitable insulating material such as bakelite which protects them from the electric current as well as from the heat.

The transformer is mounted in a suitable tank 23 which is provided with insulation 24 of bakelite or similar material. We also provide a sheet 25 of similar insulating material which covers the whole top of the transformer 16. The transformer is cooled by filling the tank with oil, this being a perfect way to cool the transformer.

We provide for an easy sliding frictional contact to carry the current to the rollers by means of a plurality of copper leaves 26.

The tops of the lugs 15 on the transformer are provided with suitable copper contacts to carry the current to the arms 11 and 12; from this it is apparent that the current travels from the secondary of the transformer 16 direct to the points of welding at the upper flanges 5 and 6 on the copper rollers 1 and 2.

It may be desirable in practice to provide a carbon leaf 27 intermediate the copper leaves 26 and the rollers 1 and 2, this operating to lessen the friction and also the thrust upon the bearing as well as furnish a good contact for the current traveling to the welding rollers.

The rollers 1 and 2 are provided with annular recesses 28 and 29 which are designed for water pockets so as to permit the rollers to be water-cooled. Outlet ports or passages 30 are provided which conduct the water to a suitable drip pan 31 which may be provided with hose connections 32 to convey the water to any suitable point of discharge.

The operation of the device is as follows: The tubing 33 is fed into the peripheral grooves 3 and 4 formed in the rollers 1 and 2; the distance between the periphery of the two rollers having been previously adjusted by means of the screw 19 and hand wheel 20. This peripheral groove should be designed so as to cover about three quarters of the way around the tubing, the current being turned on, will naturally seek the point of least resistance, and form an arc in the gap between the nearest points of the two flanges 5 and 6, thus heating the tubing to a melting point and thus by suitable pressure, fuse the seam together forming a solid tube.

By providing for the mounting of the rollers so that their spindles are vertical, we are enabled to grip a much larger surface of the tubing, thus giving a larger surface for heating than ordinarily for the electric current. This results in producing a thorough heating even when the tube is traveling at a very great rate of speed. It will at the same time be obvious to persons skilled in the art, that the sole and only means to clamp the tube or shape to be welded, are the grooves formed in the welding rollers 1 and 2 and that no other supporting rollers are used in combination with the welding rollers.

The welding machine may be operated by any suitable drive and it may also be found desirable in practice to provide a hammering machine arranged close to the welding rollers which will hammer the welded seam smooth as it comes out red hot from the rollers. This results in producing a finished tubing smooth inside and outside and which will be as strong, if not stronger, than a seamless tube of the same guage.

Having described our invention what we regard as new and desire to secure by Letters Patent is:

1. In a device of the character described the combination with a transformer of a tank in which said transformer is mounted, means to insulate the transformer from said tank, arms pivotally mounted upon lugs formed on said transformer, electrical contacts between said lugs and said arms, vertical spindles mounted in said arms, welding rollers rotatively mounted on said vertical spindles, anti-friction bearings intermediate said rollers and said spindles, a bushing of suitable insulation intermediate the rollers and the bearings, means to adjust the distance between the two spindles, electric contacts of yielding material intermediate the rollers and the arms, there being recesses in said rollers for the admission of a cooling fluid and exhaust ports or passages for the escape of said cooling fluid, a receptacle to receive said cooling means, outlets to discharge said means, for the purpose set forth substantially as described.

2. In a device of the character described, the combination with a transformer of a tank in which said transformer is mounted, means to insulate the transformer from said tank, arms pivotally mounted upon lugs formed on said transformer, electrical contacts between said lugs and said arms, vertical spindles mounted in said arms, welding rollers rotatively mounted on said vertical spindles, said rollers comprising electrical conducting material and being formed with peripheral grooves providing flanges, the electrical conducting material of one of said rollers being in closer proximity to the electrical conducting material of the other of said rollers through one pair of adjacent flanges than through the other pair of flanges, anti-friction bearings intermediate said rollers and said spindles, a bushing of suitable insulation intermediate the rollers and the bearings, means to adjust the distance between the two spindles, electric contacts of yielding material intermediate the rollers and the arms, there being recesses in said rollers for the admission of a cooling fluid and exhaust ports or passages for the escape of said cooling fluid, a receptacle to receive said cooling means, having outlets to discharge said means, for the purpose set forth substantially as described.

3. An electric welding machine having a pair of vertical spindles, rollers rotatively mounted thereon, said rollers comprising electrical conducting material and being formed with peripheral grooves providing flanges, the electrical conducting material of one of said rollers being in closer proximity to the electrical conducting material of the other of said rollers through one pair of adjacent flanges than through the other pair of flanges, anti-friction bearings for said rollers, means to conduct an electric current to said rollers, said rollers being provided with annular channels for the reception of cooling fluid.

4. In a device of the character described, the combination with a transformer of a tank in which said transformer is mounted, means to suitably insulate the transformer from the tank, arms pivotally mounted upon lugs formed on said transformer, electrical contacts between said lugs and said arms, vertical spindles mounted in said arms, welding rollers rotatively mounted on said vertical spindles, anti-friction bearings intermediate said rollers and said spindles, a bushing of insulation intermediate the rollers and the bearings, means to adjust the distance between the two spindles, a plurality of laminæ of copper and an upper lamina of carbon intermediate the rollers and the arms, there being recesses in said rollers for the admission of a cooling fluid, a receptacle to receive said cooling means, having outlets to discharge said means, for the purpose set forth substantially as described.

5. An electric welding machine having a pair of vertical spindles, rollers rotatively mounted thereon, said rollers comprising electrical conducting material and being formed with peripheral grooves providing flanges, the electrical conducting material of one of said rollers being in closer proximity to the electrical conducting material of the other of said rollers through one pair of adjacent flanges than through the other pair of flanges, anti-friction bearings for said rollers, means to conduct an electric current to said rollers, said rollers being provided with annular channels for the reception of cooling fluid, and means to vary the distance between said spindles.

6. An electric welding machine having a pair of vertical spindles, rollers rotatively mounted thereon, said rollers comprising electrical conducting material and being formed with peripheral grooves providing flanges, the electrical conducting material of one of said rollers being in closer proximity to the electrical conducting material of the other of said rollers through one pair of adjacent flanges than through the other pair of flanges, anti-friction bearings for said rollers, means to conduct an electric current to said rollers, means to cool said rollers, means to vary the distance between said spindles, a pair of arms in which said spindles are mounted, and pivots on which said arms swing whereby the distance between said spindles may be varied.

7. An electric welding machine having a pair of vertical spindles, rollers rotatively mounted thereon, said rollers comprising electrical conducting material and being formed with peripheral grooves providing flanges, the electrical conducting material of one of said rollers being in closer proximity to the electrical conducting material of the other of said rollers through one pair of adjacent flanges than through the other pair of flanges, anti-friction bearings for said rollers, means to conduct an electric current to said rollers, means to cool said rollers, means to vary the distance between said spindles, a pair of arms in which said spindles are mounted, pivots on which said arms swing whereby the distance between said spindles may be varied, and means to hold said spindles in position.

8. An electric welding machine having a pair of vertical spindles, rollers rotatively mounted thereon, said rollers comprising electrical conducting material and being formed with peripheral grooves providing flanges, the electrical conducting material of one of said rollers being in closer proximity to the electrical conducting material of the other of said rollers through one pair of adjacent flanges than through the other pair of flanges, anti-friction bearings for said rollers, means to conduct an electric current to said rollers, means to insulate said bearings from said electric current, and means to cool said rollers.

9. An electric welding machine having a pair of vertical spindles, rollers rotatively mounted thereon, said rollers comprising electrical conducting material and being formed with peripheral grooves providing flanges, the electrical conducting material of one of said rollers being in closer proximity to the electrical conducting material of the other of said rollers through one pair of adjacent flanges than through the other pair of flanges, anti-friction bearings for said rollers, means to conduct an electric current to said rollers, means to insulate said bearings from said electric current, said rollers being provided with annular channels for the reception of cooling fluid, and means to vary the distance between said spindles.

10. An electric welding machine having a pair of vertical spindles, rollers rotatively mounted thereon, said rollers comprising electrical conducting material and being formed with peripheral grooves providing flanges, the electrical conducting material of one of said rollers being in closer proximity to the electrical conducting material of the other of said rollers through one pair of adjacent flanges than through the other pair of flanges, anti-friction bearings for said rollers, means to conduct an electric current to said rollers, means to insulate said bearings from said electric current, means to cool said rollers, means to vary the distance between said spindles, a pair of arms in which said spindles are mounted, and pivots on which said arms swing whereby the distance between said spindles may be varied.

11. An electric welding machine having a pair of vertical spindles, rollers rotatively mounted thereon, said rollers comprising electrical conducting material and being formed with peripheral grooves providing flanges, the electrical conducting material of one of said rollers being in closer proximity to the electrical conducting material of the other of said rollers through one pair of adjacent flanges than through the other pair of flanges, anti-friction bearings for said rollers, means to conduct an electric current to said rollers, means to insulate said bearings from said electric current, means to cool said rollers, means to vary the distance between said spindles, a pair of arms in which said spindles are mounted, pivots on which said arms swing whereby the distance between said spindles may be varied, and means to hold said spindles in position.

12. An electric welding machine having a pair of vertical spindles, rollers rotatively mounted thereon, said rollers comprising electrical conducting material and being formed with peripheral grooves providing flanges, the electrical conducting material of one of said rollers being in closer proximity to the electrical conducting material of the other of said rollers through one pair of adjacent flanges than through the other pair of flanges, anti-friction bearings for said rollers, said rollers being the sole means for clamping the tube while it is welded, means to conduct an electric current to said rollers, means to cool said rollers, and means to vary the distance between said spindles.

13. An electric tube welding machine having a pair of vertical spindles, rollers rotatively mounted thereon, said rollers comprising electrical conducting material and being formed with peripheral grooves providing flanges, the electrical conducting material of one of said rollers being in closer proximity to the electrical conducting material of the other of said rollers through one pair of adjacent flanges than through the other pair of flanges, anti-friction bearings for said rollers, a tank, a transformer within said tank, means to insulate said transformer from the tank and welding mechanism, a cooling medium in said tank, means to conduct an electric current from said transformer to said rollers, means to cool said rollers, and means to vary the distance between said spindles.

14. In a welding machine, the combination of a tank, a transformer in said tank, an electric welding mechanism mounted above said transformer, a cooling medium to cool said transformer in said tank, said welding mechanism comprising a pair of vertical spindles, rollers comprising electrical conducting material rotatively mounted thereon having peripheral grooves therein providing flanges, the electrical conducting material of one of said rollers being in closer proximity to the electrical conducting material of the other of said rollers through one pair of adjacent flanges than through the other pair of flanges, means to conduct an electric current to said rollers, said rollers being the sole means to clamp the tube while it is welded.

15. In a welding machine, the combination of a tank, a transformer in said tank, an electric welding mechanism mounted above said transformer, a cooling medium to cool said transformer in said tank, said welding mechanism comprising a pair of vertical spindles, rollers comprising electrical conducting material rotatively mounted thereon having peripheral grooves therein providing flanges, the electrical conducting material of one of said rollers being in closer proximity to the electrical conducting material of the other of said rollers through one pair of adjacent flanges than through the other pair of flanges, means to conduct an electric current to said rollers, said rollers being the sole means to clamp the tube while it is welded, means to cool said rollers, and means to vary the distance between said spindles.

16. In a welding machine, the combination of a tank, a transformer in said tank, an electric welding mechanism mounted above said transformer, a cooling medium to cool said transformer in said tank, said welding mechanism comprising a pair of vertical spindles, rollers comprising electrical conducting material rotatively mounted thereon having peripheral grooves therein providing flanges, the electrical conducting material of one of said rollers being in closer proximity to the electrical conducting material of the other of said rollers through one pair of adjacent flanges than through the other pair of flanges, means to conduct an electric current to said rollers, said rollers being the sole means to clamp the tube while it is welded, means to cool said rollers, and means to vary the distance between said spindles, a pair of arms in which said spindles are mounted and pivots on which said arms swing.

17. An electric tube welding machine having a pair of vertical spindles, rollers comprising electrical conducting material rotatively mounted thereon, said rollers being formed with peripheral grooves providing flanges, the electrical conducting material of one of said rollers being in closer proximity to the electrical conducting material of the other of said rollers through one pair of adjacent flanges than through the other pair of flanges, anti-friction bearings for said rollers, a tank, a transformer within said tank, a cooling medium in said tank, means to insulate said transformer from the tank and welding mechanism, means to conduct an electric current to said rollers, and means to cool said rollers.

18. An electric tube welding machine having a pair of vertical spindles, rollers comprising electrical conducting material rotatively mounted thereon, said rollers being formed with peripheral grooves providing flanges, the electrical conducting material of one of said rollers being in closer proximity to the electrical conducting material of the other of said rollers through one pair of adjacent flanges than through the other pair of flanges, anti-friction bearings for said rollers, a tank, a transformer within said tank, a cooling medium in said tank, means to insulate said transformer and welding mechanism from the tank, means to conduct an electric current to said rollers, and means to cool said rollers, said rollers being the sole means for clamping the tube while it is welded.

19. In a welding machine, the combination of a tank, a transformer in said tank, an electric welding mechanism mounted above said transformer, a cooling medium to cool said transformer in said tank, said welding mechanism comprising a pair of vertical spindles, rollers comprising electrical conducting material rotatively mounted thereon having peripheral grooves therein providing flanges, the electrical conducting material of one of said rollers being in closer proximity to the electrical conducting material of the other of said rollers through one pair of adjacent flanges than through the other pair of flanges, means to conduct an electric current to said rollers, said rollers being the sole means to clamp the tube while it is welded, means to cool said rollers, a pair of arms pivotally secured to said transformer, and spindles mounted on said arms, means to vary the distance between said spindles.

20. Welding apparatus comprising a pair of grooved welding rollers, the grooved portions thereof being formed to embrace practically the entire periphery of a circle, said grooved portions of each roller comprising a current conducting flange and an opposed tube holding flange, the electrical conducting material of one of said rollers being in closer proximity to the electrical conducting material of the other of said rollers through said current conducting flanges than through said other flanges.

21. Welding apparatus comprising a pair of grooved welding rollers, the grooved portions thereof being formed to embrace practically the entire periphery of a circle, said grooved portions of each roller comprising a current conducting flange and an opposed tube holding flange, the current conducting flange of one roller being in closer electrical proximity to the current conducting flange of the other roller through their peripheries than through other parts of said rollers.

22. Welding apparatus including a pair of adjacent grooved welding rollers having their axes substantially parallel, said welding rollers being adapted to receive between them a tube to be welded and to embrace said tube throughout practically all of its periphery, a side portion of one of said rollers being in relatively close electrical proximity to the corresponding side portion of the other of said pair of rollers whereby upon the application of a potential difference across said rollers, current tends to flow between said electrically proximate side portions.

23. Welding apparatus comprising a pair of welding rollers having their axes substantially parallel, said rollers having their peripheries grooved and being shaped to conform practically to the entire periphery of a tube to be welded whereby to hold said tube firmly during the welding operation, the corresponding side portions of said two rollers being composed of electrically conducting material and being slightly spaced apart from one another, though in closer electrical proximity through said slight space than through any other path.

24. An electric welding machine provided with a pair of welding rollers having their axes substantially parallel, said rollers being formed with peripheral grooves providing flanges, one flange of each of said rollers comprising an electrical current conducting welding flange composed of electrical conducting material, said welding flanges being in closer electrical proximity directly between their peripheries than through any other parts of said rollers.

25. An electric welding machine provided with a pair of welding rollers having their axes substantially parallel, said rollers being formed with peripheral grooves providing flanges, one flange of each of said rollers comprising an electrical current conducting welding flange composed of electrical conducting material, said welding flanges being in closer electrical proximity directly between their peripheries than through any other parts of said rollers, and means for adjustably holding said rollers in predetermined spaced relation.

26. In a device of the character described, the combination with a transformer of a tank in which said transformer is mounted, welding electrodes, means for adjustably holding said electrodes in predetermined spaced relation and for providing a short electrical path through said electrodes to said transformer, said electrodes comprising welding rollers, said rollers being mounted upon vertical axes and being provided with recesses for the reception of a cooling fluid.

27. In a device of the character described, the combination with a transformer of a tank in which said transformer is mounted, means to insulate said transformer from said tank, welding electrodes, means for mounting said electrodes and for providing a short electrical path from said transformer to said electrodes, said electrodes comprising welding rollers having vertical axes.

28. In a device of the character described, the combination with a transformer of a tank in which said transformer is mounted, means to insulate said transformer from said tank, welding electrodes, means for mounting said electrodes and for providing a short electrical path from said transformer to said electrodes, said electrodes comprising a pair of adjacent grooved welding rollers having their axes substantially parallel, said welding rollers being adapted to receive between them a tube to be welded and to embrace said tube throughout practically all of its periphery, a side portion of one of said rollers being in relatively close electrical proximity to the corresponding side portion of the other of said pair of rollers whereby upon the application of a potential difference across said rollers, current tends to flow between said electrically proximate side portions.

29. An electrical welding machine having a pair of rotating rollers having vertical axes, said rollers being peripherally grooved, the upper portions of each of said rollers being provided with a current conducting welding flange, said upper portions being in closer electrical proximity to one another through said flanges than through any other parts of said rollers.

In testimony whereof we have signed the foregoing specification.

NELS P. SJOBRING.
MARTIN SWANSON.